US008861945B2

(12) United States Patent
Wild et al.

(10) Patent No.: US 8,861,945 B2
(45) Date of Patent: Oct. 14, 2014

(54) APPARATUS AND METHOD FOR HEATING A PRODUCT STREAM

(75) Inventors: Hans-Peter Wild, Eppelheim (DE); Wolfgang Tilz, Schwetzingen (DE); Dominique Chatard, Heidelberg (DE); Axel De With, Plankstadt (DE)

(73) Assignee: Indag Gesellschaft für Industriebedarf mbH & Co. Betriebs KG, Eppelheim (DE)

( * ) Notice: Subject to any disclaimer, the term of this patent is extended or adjusted under 35 U.S.C. 154(b) by 974 days.

(21) Appl. No.: 12/861,464

(22) Filed: Aug. 23, 2010

(65) Prior Publication Data
US 2011/0052162 A1 Mar. 3, 2011

(30) Foreign Application Priority Data

Aug. 27, 2009 (EP) ..................................... 09168790

(51) Int. Cl.
F24H 1/10 (2006.01)
A23L 3/005 (2006.01)
H05B 6/60 (2006.01)
A23L 3/22 (2006.01)
A23C 3/033 (2006.01)

(52) U.S. Cl.
CPC .............. *A23C 3/0335* (2013.01); *A23L 3/005* (2013.01); *H05B 6/60* (2013.01); *A23L 3/22* (2013.01)
USPC ....................................................... 392/480

(58) Field of Classification Search
CPC ........ A23C 3/0335; A23L 3/005; A23L 3/22; H05B 6/60
USPC ......... 219/200, 201, 385, 391, 399, 400, 482, 219/490, 494, 501, 678, 686, 698, 700, 762, 219/771, 775, 779, 780; 392/480; 99/358, 99/451, 452, 453, 467, 483
See application file for complete search history.

(56) References Cited

U.S. PATENT DOCUMENTS 1,775,579 A 9/1930 Woodrich
2,508,365 A 5/1950 Bierwirth
(Continued)

FOREIGN PATENT DOCUMENTS

DE 3606032 8/1987
EP 1487240 12/2001
(Continued)

OTHER PUBLICATIONS

Search Report issued on Mar. 2, 1020 in the related European Patent Appln. No. 09168790.5.

*Primary Examiner* — Dana Ross
*Assistant Examiner* — Joseph Iskra
(74) *Attorney, Agent, or Firm* — Stroock & Stroock & Lavan LLP

(57) ABSTRACT

This disclosure relates to an apparatus and a method for heating a product stream, in particular a basic material for the beverage industry, and especially a milk drink or a mixed milk drink. Due to the fact that, in a heating module, a treatment channel is formed between alternating current electrodes in such a way that the product flows from the first electrode to the second electrode substantially in a main flow direction, the electrode spacing and the cross-section of the treatment channel can be dimensioned largely independently from one another and the energy input in the product as well as the flow behavior of the product can be optimized. This promotes uniform heating of the product and helps to avoid undesirable depositions in the treatment channel.

30 Claims, 3 Drawing Sheets

(56) References Cited

U.S. PATENT DOCUMENTS

| | | | |
|---|---|---|---|
| 3,087,840 A * | 4/1963 | Shaw | 366/108 |
| 5,662,031 A * | 9/1997 | Qin et al. | 99/451 |
| 5,834,746 A * | 11/1998 | Pedersen et al. | 219/771 |
| 2005/0019025 A1 | 1/2005 | Wild et al. | |
| 2006/0096466 A1 | 5/2006 | Tonello | |
| 2008/0017623 A1 | 1/2008 | Dock | |

FOREIGN PATENT DOCUMENTS

| | | |
|---|---|---|
| EP | 1886586 | 2/2008 |
| GB | 009567 | 0/1915 |
| GB | 294903 | 10/1929 |
| GB | 713161 | 8/1954 |
| SU | 1026749 | 7/1983 |
| WO | WO 92/22180 | 12/1992 |
| WO | WO 96/04804 | 2/1996 |

* cited by examiner

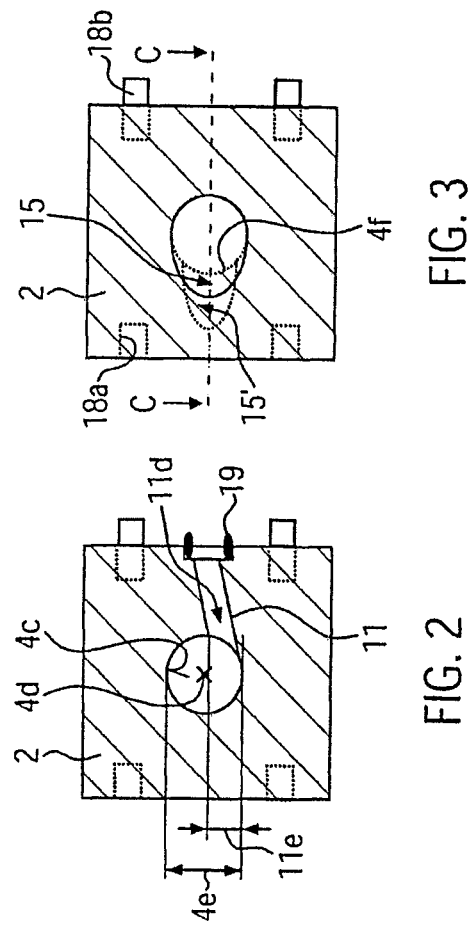

APPARATUS AND METHOD FOR HEATING A PRODUCT STREAM

FIELD OF THE INVENTION

The present invention relates to an apparatus and a method for heating a liquid product stream, for example a basic material for the beverage industry.

BACKGROUND OF THE INVENTION

It is generally known to increase the shelf life of liquid products by killing germs and/or spores through heating and/or by inactivating enzymes.

The patent specification EP 1 487 240 B1 describes in this respect an apparatus in which an alternating current field is generated between pairs of electrodes arranged transversely to the flow direction of the product on the inner side of a treatment channel. The cross-section of the channel is configured for a laminar flow so as to cause the least possible shear in the product. This arrangement allows a particularly gentle treatment and is suitable, for example, for mixed products containing fruit pieces.

However, as regards the structural design and the application of this arrangement, problems arise, since the necessary energy input depends on the electric conductance of the product, the flow behavior of the product in the channel and the product temperature as well as on the clearance between the alternating current electrodes. This clearance influences, in turn, the flow behavior of the product. In the case of high conductance values and high product temperatures, it may be necessary to increase the spacing between the electrodes to such an extent that the product flow cannot be controlled in the desired manner. This can result, for example, in non-uniform heating of the product and/or in undesirable depositions in the treatment channel, a so-called fouling effect.

Since the product normally passes through a plurality of heating stages and since the electrode spacing can, for the above-mentioned reasons, sometimes not be adapted to the respective temperature ranges that are to be covered, individual heating stages have to be supplied by separate alternating current generators which are configured for the temperature range in question. This entails a substantial investment in the equipment used.

In addition, many products can be heated more uniformly and more efficiently, when a shear occurs in the products at high flow velocities. It can thus be avoided that the quality of the product, in particular color, flavor, protein content and consistency, degrades essentially in comparison with the original product. The known apparatuses are, however, not suitable for generating adequately strong and/or turbulent flows in a satisfactory manner.

SUMMARY OF THE INVENTION

The present invention provides an improved apparatus and an improved method for heating product streams, in particular for liquids which can be heated more efficiently making use of a strong and turbulent flow, so as to preserve the product as reliably, efficiently and carefully as possible.

In one aspect, the invention provides an apparatus for heating a product flow, comprising at least one heating module having formed therein a treatment channel through which the product flows. An alternating current source is provided for generating an electromagnetic alternating field in the treatment channel. The treatment channel includes a first, inlet-side electrode and a second, outlet-side electrode provided on the heating module for establishing the alternating field between the electrodes, wherein the treatment channel between the electrodes is configured such that the product can flow essentially in a main flow direction from the first electrode to the second electrode.

In an exemplary embodiment, the product is a basic material for the beverage industry. In other embodiments the product is a milk drink or a mixed milk drink.

In another embodiment, the electrodes are substantially configured as plate-shaped or curved lids, which are disposed in or on the ends of the treatment channel and which seal opposite ends of the treatment channel.

In another embodiment, the apparatus further comprises an inlet channel terminating laterally into the treatment channel and comprising a portion which adjoins a wall of the treatment channel such that the product can flow in substantially tangentially along the wall of the treatment channel.

In another embodiment, a cross-section of the inlet channel is smaller than the cross-section of the treatment channel such that the product can essentially flow in on only one side of a main axis of the treatment channel. In another embodiment, a cross-sectional area of the inlet channel is at least five times smaller than the cross-sectional area of the treatment channel. In still a further embodiment, the cross-sectional area of the inlet channel is at least ten times smaller than the cross-sectional area of the treatment channel.

In still a further embodiment, a distance between the inlet channel and the inlet-side electrode does not exceed 3 mm. In certain embodiments, a distance between the inlet channel and the inlet-side electrode does not exceed 1 mm.

In a further embodiment, the apparatus further comprises an outlet channel terminating laterally into the treatment channel and comprising a portion which adjoins a wall of the treatment channel such that the product can flow out substantially tangentially along the wall of the treatment channel.

In still another embodiment, the treatment channel has formed therein a recess for conducting the product along a helical line in the main flow direction on the inner wall of the treatment channel. In another embodiment, the recess has a helical or an arcuate shape.

In another embodiment, an inlet opening for the product is formed in a first lateral outer surface of the heating module and an outlet opening for the product is formed in a second opposed lateral outer surface such that at least two heating modules can be placed side by side on the lateral surfaces, so that the outlet opening of the first heating module comes to lie opposite the inlet opening of the second heating module for connecting the treatment channels of the heating modules in series, the main flow directions of the first and of the second heating module being substantially opposed to one another.

In still another embodiment, the spacing between the electrodes is between 20 and 800 mm. In still a further embodiment, the spacing between the electrodes is between 20 and 500 mm.

In a further embodiment, a surface roughness of the treatment channel does not exceed 1 μm.

In certain embodiments, the electrodes are corrosion resistant at an alternating current frequency of at least 10 kHz and compatible with food.

In other embodiments, the apparatus further comprises at least two heating stages connected in series with respect to the product flow and comprising each at least one heating module, a spacing between the respective electrodes of one and the same heating stage being substantially identical and increasing in size as the mean product temperature in the respective heating stage increases.

In other embodiments, the electrodes of the heating modules of different heating stages are connected in parallel to the alternating current source.

In still another embodiment, the invention provides a method for heating a product stream, comprising the steps of conducting the product in a continuous flow through a treatment channel formed in a heating module; and generating an electromagnetic alternating field in the treatment channel between a first electrode and a second electrode provided on the heating module, so as to heat the product, wherein the product flows from the first electrode to the second electrode substantially in a main flow direction.

In a further embodiment, the method further comprises generating a turbulent product flow in the treatment channel.

In certain embodiments, the method further comprises adapting a spacing between the electrodes to the mean product temperature in the treatment channel so as to operate a plurality of heating modules, which are series-connected on the product side and which have with different mean product temperatures, on a common alternating current source.

In certain other embodiments, the method further comprises adapting a spacing between the electrodes to the electric conductance of the product, wherein the specific conductance of the product ranges from 30 µS/cm to 10,000 µS/cm.

In some embodiments, the method further comprises applying an alternating voltage of at least 10 kHz to the electrodes.

In some embodiments, the method further comprises, in an area of the first electrode, conducting the product flow in tangentially on a wall of the treatment channel such that a turbulent flow is produced on the first electrode so as to avoid product depositions on said first electrode.

Additional features and advantages of the present invention are described further below. This summary section is meant merely to illustrate certain features of the invention, and is not meant to limit the scope of the invention in any way. The failure to discuss a specific feature or embodiment of the invention, or the inclusion of one or more features in this summary section, should not be construed to limit the invention as claimed.

BRIEF DESCRIPTION OF THE DRAWINGS

The foregoing summary, as well as the following detailed description of the preferred embodiments of the application, will be better understood when read in conjunction with the appended drawings. For the purposes of illustrating the device of the present application, there is shown in the drawings preferred embodiments. It should be understood, however, that the application is not limited to the precise arrangements and instrumentalities shown. In the drawings:

FIG. 2 shows a schematic cross-section of the heating module of the first embodiment along section line A-A of FIG. 1.

FIG. 3 shows a schematic cross-section of the heating module of the first embodiment along section line B-B of FIG. 1.

DETAILED DESCRIPTION OF THE INVENTION

The object of the present invention is to provide an improved apparatus and an improved method for heating product streams, in particular for liquids which can be heated more efficiently by making use of a strong and turbulent flow, so as to preserve the product as reliably, efficiently and carefully as possible.

This object is achieved by means of an apparatus comprising a heating module in which the treatment channel between the electrodes is configured such that the product can flow essentially in a main flow direction from the first electrode to the second electrode. The electrode spacing and the cross-section of the treatment channel can thus be dimensioned largely independently from one another and the energy input applied to the product as well as the flow behavior of the product can be optimized in this way. In particular, the cross-section of the treatment channel, for example, its diameter, can be configured such that a turbulent flow will occur in the treatment channel at a predetermined flow velocity.

Figure 1:
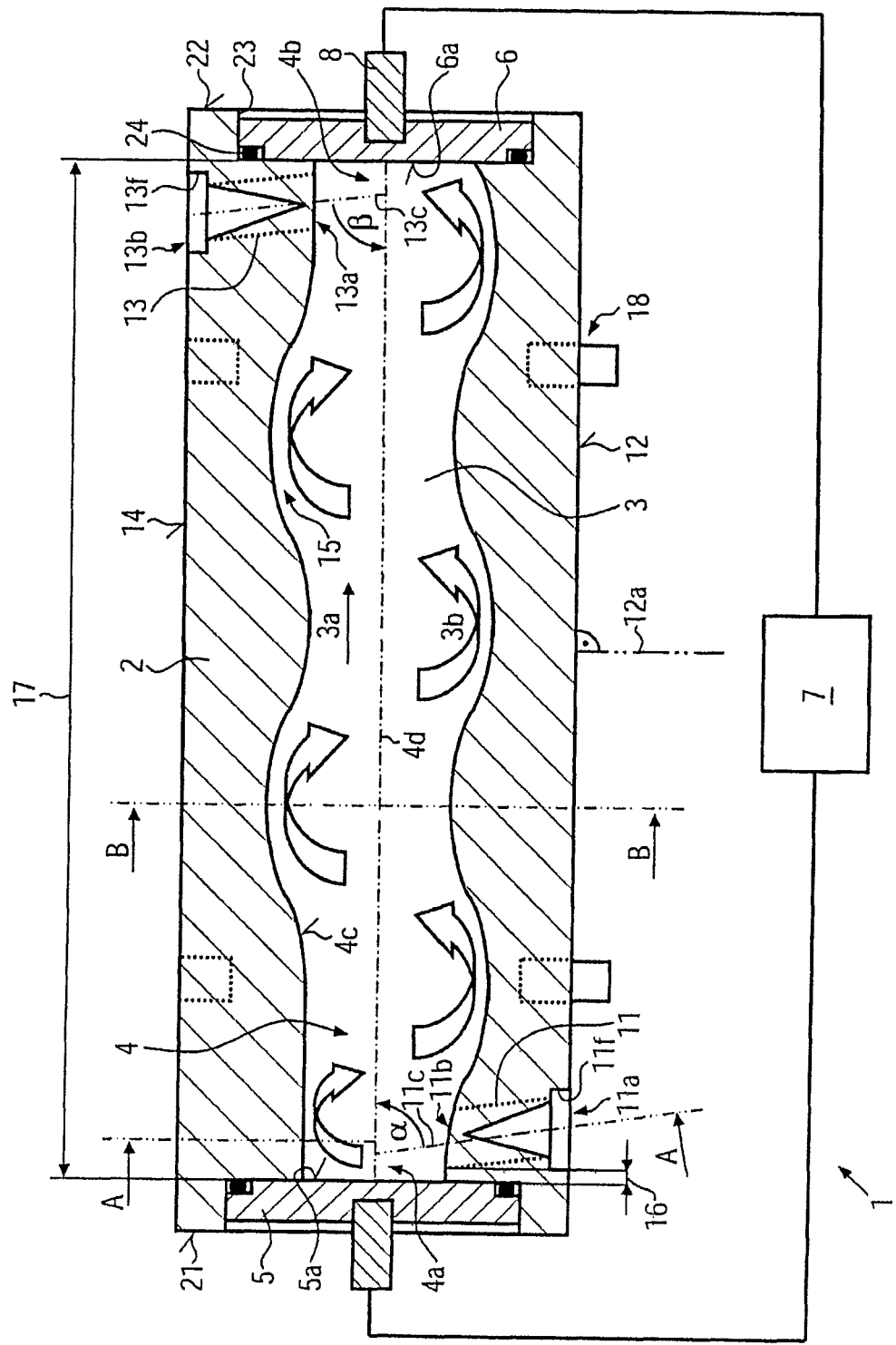
FIG. 1 shows a schematic representation of a first embodiment with a heating module in a sectional view along line C-C of FIG. 3, from above.

As can be seen in FIG. 1, the apparatus 1 according to the present invention comprises a heating module 2 with a product-carrying treatment channel 4 having inlet-side and outlet-side ends 4a, 4b and extending substantially between electrodes 5, 6 for generating an electromagnetic alternating field in the treatment channel 4. The arrow 3a indicates the main flow direction of the product 3. An alternating current source 7 is connected to the electrodes 5, 6 via electrode connectors 8.

For supplying the product 3, the heating module 2 has provided therein a lateral inlet channel 11 with an inlet opening 11a provided in a first lateral outer surface 12 of the heating module 2 which extends substantially parallel to the main flow direction 3a, and a lateral outlet channel 13 with an outlet opening 13b provided in a second lateral outer surface 14, which is located opposite to the first outer surface 12 and which extends preferably parallel to the latter. External connections and conduits for the product 3 are not shown for the sake of clarity.

Furthermore, it can clearly be seen from FIG. 2 that at least a wall area 11d of the inlet channel 11 adjoins the wall 4c of the treatment channel 4 such that it is flush therewith, so that the product 3 is fed in substantially tangentially to the wall 4c and flows then along said wall. In view of the continuously incoming product 3 a substantially helical flow 3b will, depending on the respective flow velocity and product viscosity, result from this in combination with the main flow direction 3a, said helical flow 3b taking place about the longitudinal axis 4d of the treatment channel 4 in the direction of the outlet-side channel section 4b.

In order to obtain the flow 3b with a uniform sense of rotation, the cross-section of the inlet channel 11 is at least so much smaller than the cross-section of the treatment channel 4 that the product 3 will essentially flow in on only one side of the main axis 4d of the treatment channel. In the present embodiment, the height 11e of the inlet channel 11 corresponds therefore preferably to less than half the height 4e of the treatment channel 4, so that the product will in this case flow in below the main axis 4d (the indications "height" and "below" refer here only to the representation in the drawing). The cross-section of the inlet channel 11 is, for example, round, but it may also be rectangular, preferably with rounded corners. The flush transition area or tangential transition area that can be realized between the inlet channel 11 and the treatment channel 4 when a substantially rectangular cross-section is used is larger than that which can be realized in the case of round cross-sections. This applies equally to the cross-section of the outlet channel 13.

The cross-sectional area of the inlet channel 11 is preferably at least five times, and in particular at least ten times smaller than the cross-sectional area of the treatment channel 4. This has not only the effect that the product flow can be fed in in a particularly precise manner, but, similar to a jet effect, also the speed of the product 3 can be increased especially in the area of the electrode 5. Hence, additional turbulences can be generated and/or the risk that contaminations accumulate in the area of the electrode 5 can be reduced.

The wall 4c of the treatment channel 4 has preferably, but not obligatorily, formed therein a helical recess 15 which conducts the product 3 from the inlet channel 11 along the wall 4c up to the outlet channel 13 essentially along a helical line. The recess 15 is configured such that it maintains and stabilizes the helical product flow 3b established by the tangential flowing in of the product 3. The recess 15 additionally causes an increase in the flow velocity of the product 3 through the treatment channel 4 and it is able to generate an angular momentum or turbulences in the product flow. The curved arrows in FIG. 1 show that the product flow 3b winds around the longitudinal axis 4d of the treatment channel 4 in the main flow direction 3a. The recess 15 could also be formed in an arcuate shape along a circumferential segment of the wall 4c, without a pitch in the direction of the product flow 3b.

The term helical or arcuate recess 15 describes an area in which the cross-section of the treatment channel 4 outwardly deviates from a circular cross-section 4f. This is preferably realized by an oval cross-section in the case of which the recess 15 continuously merges with the circular cross-section 4f, as shown in FIG. 3 by the solid line. It is, however, also possible to provide a rounded groove in the wall 4c, as indicated in FIG. 3 by the indentation 15' outlined by a broken line. The cross-section of the recess 15 may also vary along the length of the treatment channel 4, in particular in inlet- and outlet-side areas 4a, 4b of said treatment channel 4, for example, for the purpose of guaranteeing that the product 3 flows in tangentially, especially with the aid of the flushest possible transition between the inlet channel 11 and the treatment channel 4, and for the purpose of conducting the helical product flow 3b as uniformly as possible to the outlet channel 13.

The main axis 11c of the inlet channel 11 in the area of its outlet opening 11b as well as the main axis 13c of the outlet channel 13 in the area of its inlet opening 13a define with the main flow direction 3a an angle α and β, respectively, from 10 to 170°, preferably 90°, depending on the desired incident flow onto the inlet- and outlet-side channel areas 4a, 4b. The inlet channel 11 may be directed towards the electrode 5, as indicated in FIG. 1, so as to guarantee a particularly good incident flow onto the product-side electrode surface 5a. On the other hand, it may be of advantage to implement the angle β of the outlet channel 13 such that the helical product flow 3b is taken up by the outlet channel 13 with the least possible pressure losses, and advanced. From the point of view of production technology, identical angles α and β are desirable, in particular a value of 90°.

In order to minimize pressure losses in the apparatus 1, the contour of the recess 15 and the position of the inlet opening 13a of the outlet channel 13 are configured such that the helical product flow 3b will essentially be incident on the outlet channel 13. In this connection, it will also be of advantage when a wall area 13d (not shown) of the outlet channel 13 merges with the channel wall 4c such that it is flush therewith, in analogy with the wall area 11d of the inlet channel 11.

In order to avoid dead spots and/or areas with little incident flow in the heating module 2, the distance 16 between the electrodes 5, 6 and the inlet channel 11 and the outlet channel 13, respectively, is preferably not larger than 1 mm. When the flow incident on the areas of the heating module 2 coming into contact with the product 3 is sufficiently strong and/or turbulent, a self-cleaning effect of the apparatus 1 avoiding undesirable product depositions will be produced.

The electrodes 5, 6 need not be planar, as shown in the drawing, but they may also have a curved inner surface, for example, with a concave shape, so as to adapt the electric field to the flow conditions.

The inlet- and outlet-side end faces 21, 22 of the heating module 2 have each formed therein a recess 23, such as a groove, for accommodating the electrodes 5, 6. The latter are arranged in said recess 23 preferably at right angles to the main flow direction 3a and the longitudinal axis 4d of the treatment channel 4. The electrodes 5, 6 may close the treatment channel 4 on both sides like a lid. In particular when the electrodes 5, 6 sealingly close the recess 23, for example, with the aid of sealing means 24 provided therebetween, the cross-sections of the end portions 4a, 4b of the treatment channel 4 can be given various shapes. In the example shown in FIG. 1, the cross-section on the inlet-side end 4a is round, i.e. no recess 15 is provided, said recess 15 being, however, formed on the outlet-side end 4b. Arbitrary cross-sectional variants are within the scope of the invention. The electrodes 5, 6 may also partially project into the treatment channel 4 so that they additionally abut on the wall 4c of said treatment channel 4. In an exemplary embodiment, the product-side electrode surfaces 5a, 6a directly adjoin the wall 4c of the treatment channel 4.

The cross-section of the electrodes 5, 6 is preferably larger than the cross-section of the treatment channel 4 so as to assure that a homogeneous electric field is obtained.

For fixing the electrodes 5, 6, which are preferably produced from stainless steel, said electrodes 5, 6 may have provided thereon for example, a male thread, and a complementary female thread may be provided in the recesses 23 (the respective threads are not shown). Other fastening modes are, however, possible as well, for example, the flanges 39 indicated in FIG. 4.

The spacing 17 between the electrodes 5, 6 is preferably 20 to 500 mm, in particular 40 to 500 mm. A suitable dimensioning of the electrode spacing 17 allows the heating module 2 or a group of series-connected and identically dimensioned heating modules 2 to be flexibly adapted to a specific range of product temperatures and to a specific volume flow. It follows that the apparatus 1 is particularly suitable for products 3 having a specific electric conductance of from 30 μS/cm to 10,000 μS/cm and for executing treatments at temperatures of up to 500° C.

The lateral surfaces 12, 14 have provided therein guide means 18, which may comprise for example, blind holes 18a and guide pins 18b. The positions of the guide means 18 on the opposed sides 12, 14 correspond to one another such that two uniform heating modules 2 can be attached to one another on said sides 12, 14, when the first heating module 2 is rotated relative to the second heating module 2 by 180° about a perpendicular 12a to the lateral surface 12.

Also the inlet and outlet openings 11a, 13b are arranged such that they correspond to one another, so that when heating modules 2 have been rotated by 180° relative to one another and attached to one another, the outlet opening 13b of one module 2 is arranged in opposed relationship with the inlet opening 11a of the other module 2. For the purpose of sealing, a respective recess 11f, 13f may be provided at the openings 11a, 13b, said recesses 11f, 13f being used for accommodating therein a common annular sealing means 19. The recesses 11f, 13f are preferably implemented such that they have the same depth, so that, when two modules 2 are attached to one another, the sealing means 19 will seal the modules 2 from one another.

The heating module 2, and especially the product-side surfaces thereof, is/are produced from a dielectric material, which is not harmful to food. The dielectric material may in certain embodiments be high temperature resistant plastic, glass or ceramic.

Figure 4:
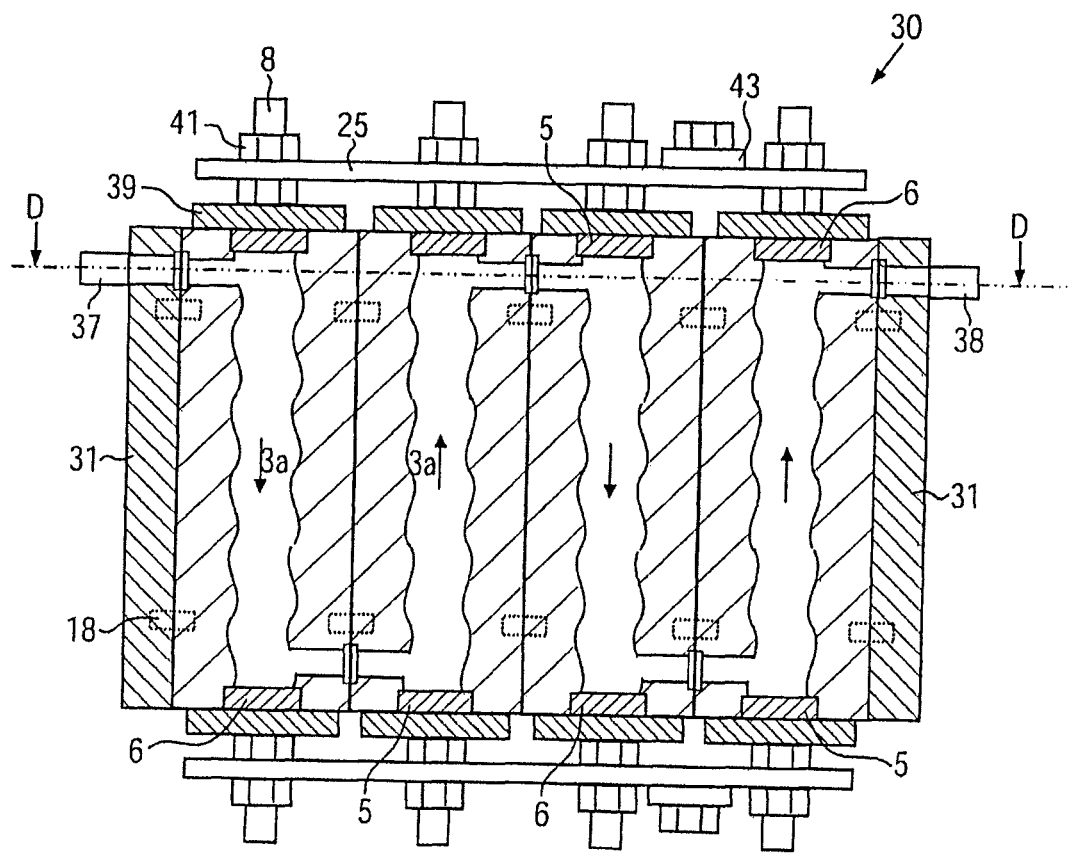
FIG. 4 shows a schematic fragmentary section, seen from above, of a heating stage of a second embodiment with a plurality of series-connected heating modules, along section line E-E of FIG. 5.

The electrode connectors 8 may for example, be configured as threaded pins which are screwed into the electrodes 5, 6. The electrode connectors 8 are arranged such that, when heating modules 2 are disposed side by side in the way described hereinbefore, said electrode connectors 8 will be arranged in one line, whereby a common electric connection can easily be established, for example, with a perforated conductor plate 25, as indicated in FIG. 4.

The alternating current source 7 operates preferably in the high frequency range from 10 kHz onwards, so as to suppress or prevent electrochemical reactions on the electrodes 5, 6. The alternating current source 7 may, for example, operate at a frequency of 200 kHz. In view of the flexible adaptability of the heating modules 2 accomplished by a variation of the electrode spacing 17, the apparatus is, however, able to operate at different frequencies.

In the case of the volume flows that have to be dealt with in practice, a desired treatment temperature can often only be achieved through a series connection of a plurality of heating stages 30 on the product side, by heating the product, for example, to 40° C. in a first heating stage, to 60° C. in a second stage, and to 80° C. in a third stage. The preferred increase in temperature of the product 3 per heating stage lies between 1 and 20° C. For providing sufficient heating power, each heating stage 30 normally comprises a plurality of series-connected heating modules 2, for example, ten heating modules. For reasons of costs and in order to allow easy process control, it is desirable that the heating modules 2 of all heating stages 30 are supplied in parallel by a common alternating current source 7.

The adaptation of the individual heating modules 2 to the alternating current source 7, the conductance and the volume flow of the product 3 as well as to the temperature range of the respective heating stage 30 is effected by a suitable dimensioning of the electrode spacing 17, said electrode spacing 17 being preferably identical in the case of the heating modules 2 of one and the same stage 30. Provided the heating stages 30 are connected in series, the electrode spacing 17 increases in size as the product temperature and/or the temperature range of the respective heating stage increases. Likewise, the heating modules 2 and the heating stages 30 will, if necessary, be adapted to the conductance of the product 3 by selecting the electrode spacing 17 such that the higher the conductance is the larger the electrode spacing 17 will be.

It is also possible to electrically connect the respective heating modules 2, which are coupled to one another with respect to the product flow, in series or in parallel to the alternating current source 7, so as to be able to adapt the apparatus 1 according to the present invention to products 3 with different electric conductivities.

The advantage of the present invention precisely resides in that the adaptation of the heating modules 2 is possible making use of a particularly simple, uniform alternating current supply, and that, simultaneously, a controlled generation of a strong and/or turbulent flow 3b can take place in the heating modules 2 so that the product 3 will be heated efficiently and uniformly and a self-cleaning effect will be achieved as well. In addition, the shape of the heating modules 2 and the position of the inlet and outlet openings 11a, 13b and of the electrode connectors 8 allow a simple combination of the heating modules 2 so as to form compact heating stages 30, with a small number of connection elements being required. Furthermore, heat losses within the respective heating stage 30 can be minimized by disposing the modules 2 side by side, whereby the efficiency of the apparatus 1 can be optimized.

Figure 5:
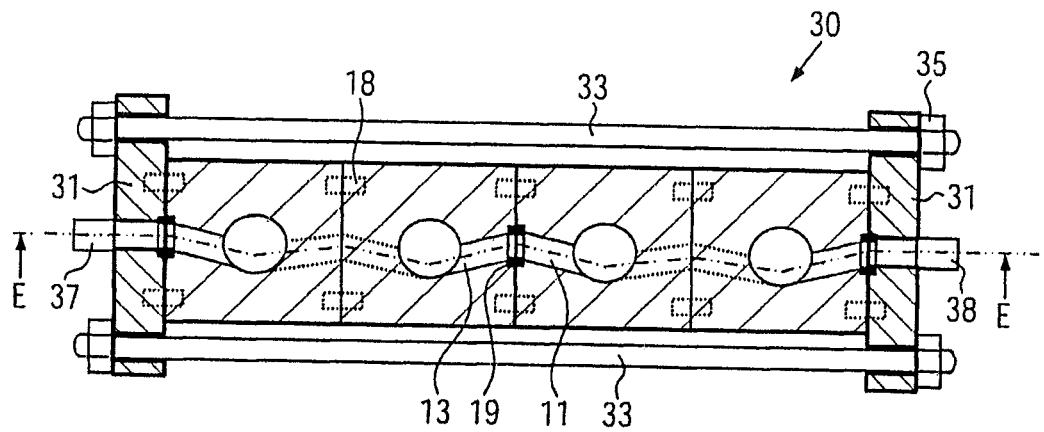
FIG. 5 shows a schematic fragmentary section, seen from the front, of the heating stage according to FIG. 4 along section line D-D.

FIGS. 4 and 5 show, in a fragmentary section seen from above and from the front, a heating stage 30 consisting of four heating modules 2. According to these representations, the heating modules 2 are preferably cuboid and are pressed together by lateral fixing flanges 31, tension rods 33 and self-clinching nuts 35. In this way, also a watertight series connection of the treatment channels 4 is obtained, a product inlet 37 and a product outlet 38 being provided on the fixing flanges 31. In the example shown, the electrodes 5, 6 are screwed onto the end faces 21, 22 of the heating modules through fastening flanges 39 (screw connection not shown), the electrode connectors 8 with screw connections 41 are interconnected by the conductor plates 25 and connected in the usual way to electric alternating current feed lines 43.

The guide means 18 are only indicated by broken lines, and, for the sake of clarity, the sealing means 19 between the inlet channels 11 and the outlet channels 13 are only shown in FIG. 5.

The features of the embodiments described can be combined with one another in an arbitrary manner. It is, however, not absolutely necessary to feed the product 3 tangentially into the treatment channel 4. The helical recess 15 in the wall 4c of the treatment channel 4 is not obligatory either. Depending on the nature of the product 3 and on the risk of a deposition of product residues, the two features can be used individually or in common for initiating and/or maintaining a sufficiently strong, and in particular a turbulent flow.

The heating modules 2 can be operated in an arbitrary orientation, so that the indications of position used, such as above, below etc., only serve to make things clearer.

The apparatus according to the present invention can be used as follows:

A product 3 to be treated, for example, a milk drink, in particular a product which is suitable for turbulent flow treatment, is conducted in a continuous flow through preferably a plurality of series-connected heating stages 30 and is thus subjected to a thermal treatment, in particular a treatment for increasing the product shelf life. In the course of this process, the product flows through individual heating modules 2 with such a strong and turbulent flow 3b that the product 3 will be heated uniformly and product depositions on the heating modules 2 will be substantially avoided.

Heating is effected by electromagnetic alternating fields in the heating modules 2, the respective fields being generated between the inlet- and outlet-side electrodes 5, 6 of each heating module 2. The product flows in the treatment channel 4 helically along the main flow direction 3a from the inlet-side electrode 5 to the outlet-side electrode 6, so that the flow can be adjusted and controlled also in the case of different electrode spacings 17. The adaptation of the heating power of the individual heating stages 30 is essentially carried out by dimensioning the respective electrode spacing 17, so that the heating stages can be supplied in parallel by a common alternating current source 7.

According to a preferred embodiment, the electrodes 5, 6 are substantially configured as plate-shaped or curved lids, which are disposed in and/or on the ends of the treatment channel 4 and close the same. This assumes that a homogeneous electric field can be applied to the product as it flows through the channel and causes thus a uniform energy input over the length and the cross-section of the treatment channel 4. A concave curvature of the electrodes 5, 6 on the side facing the channel 4 is particularly advantageous from the point of view of fluid mechanics. The electrodes close the treatment channel 4 such that it is watertight or they close it hermetically.

A particularly advantageous embodiment additionally comprises an inlet channel 11 terminating laterally into the treatment channel 4 and comprising a portion which adjoins the wall 4c of the treatment channel such that the product 3 will flow in substantially tangentially along the wall of the treatment channel. Together with the main flow direction 3a of the product, this will cause a substantially helical flow 3b of the product 3 along the wall of the treatment channel. In this way, a strong flow can be generated also in the case of large electrode spacings, whereby the product is heated efficiently and uniformly and the formation of undesirable depositions is impeded.

The cross-section of the inlet channel 11 is preferably smaller than the cross-section of the treatment channel 4 so that the product will essentially flow in on only one side of the main axis of the treatment channel. This results in the formation of a helical flow of the product with a uniform sense of rotation. The product flow can thus be controlled more easily and causes less pressure losses in the channel.

According to a preferred embodiment, the cross-sectional area of the inlet channel 11 is at least five times, and in particular ten times smaller than the cross-sectional area of the treatment channel. This has the effect that the product 3 can be fed into the treatment channel 4 in a particularly precise manner and with high velocity.

The distance between the inlet channel 11 and the inlet-side electrode 5 preferably does not exceed 3 mm, and in particular 1 mm. This has the effect that areas of weak incident flow are avoided, whereby the occurrence of depositions will be impeded still further and the self-cleaning effect of the apparatus will be improved.

A particularly advantageous embodiment additionally comprises an outlet channel 13 terminating laterally into the treatment channel 4 and comprising a portion which adjoins the wall 4c of the treatment channel such that the product will flow out substantially tangentially along the wall of the treatment channel. Pressure losses in the apparatus are minimized in this way.

The treatment channel 4 has preferably formed therein a recess 15 preferably with a helical or a bow-like shape, for conducting the product 3 along a helical line in the main flow direction on the inner wall 4c of the treatment channel. A helical product flow 3b can thus be generated and/or stabilized and directionally conducted into the outlet channel 13 and onto the outlet-side electrode 6. This allows the product flow to be adjusted in a particularly efficient and controlled manner.

According to a preferred embodiment, an inlet opening 11a for the product is formed in a first lateral outer surface of the heating module and an outlet opening 13b for the product is formed in a second, opposed lateral outer surface such that at least two heating modules can be placed side by side on said lateral surfaces, so that the outlet opening 13b of the first heating module comes to lie opposite the inlet opening 11a of the second heating module for connecting the treatment channels of the heating modules in series, the main flow directions of the first and of the second heating module being substantially opposed to one another. It is thus possible to produce a compact heating stage with a small number of connection elements. In particular, it is possible to connect the heating modules so as to form a stack of heating modules which are series connected with respect to the product flow.

The spacing 17 between the electrodes 5, 6 is preferably 20 to 800 mm, and in particular 20 to 500 mm. This allows the heating module 2 to be adapted to different product temperatures as well as to different product conductance values, without any necessity of changing the electric supply, especially the electric power and the alternating current frequency. A spacing range of 40 to 500 mm is particularly advantageous.

The surface roughness of the treatment channel 4 does preferably not exceed 1 μm. Product depositions in the treatment channel 4 can thus be avoided in a particularly reliable manner.

According to a preferred embodiment, the electrodes 5, 6 are corrosion resistant at an alternating current frequency of at least 10 kHz and compatible with food. A large frequency range can thus be utilized for heating, said frequency range extending preferably up to and including 10 MHz.

A particularly advantageous embodiment comprises at least two heating stages 30 connected in series with respect to the product flow and comprising each at least one heating module 2, the spacing between the respective electrodes of one and the same heating stage being substantially identical and increasing in size as the mean product temperature in the respective heating stage increases. This allows stepwise heating of the product 3 also over a large temperature range and an adaptation of the heating stages 30 to the product temperature without any change in the electric supply.

According to a preferred embodiment, the electrodes of the interconnected heating modules of different heating stages are connected in parallel to the alternating current source 7. The apparatus can thus be supplied more easily with energy.

The technical object is additionally achieved by a method in the case of which the product flows from the first electrode to the second electrode substantially in a main flow direction. The electrode spacing 17 and the cross-section of the treatment channel 4 can thus be dimensioned largely independently from one another and the energy input in the product 3 as well as the flow behavior of the product 3 can be optimized in this way.

According to a preferred embodiment, a turbulent product flow is generated in the treatment channel 4. To this end, the flow velocity of the product is adjusted such that it is sufficiently high. A sufficiently strong flow can thus be guaranteed also in the case of large electrode spacings 17. Such a product flow can be controlled in a particularly efficient manner and causes efficient heating of the product as well as a self-cleaning effect, and it avoids undesirable depositions in the treatment channel 4. The turbulent product flow can preferably describe a helical path along the inner wall 4c of the treatment channel.

The spacing 17 between the electrodes is preferably adapted to the mean product temperature in the treatment channel so that a plurality of heating modules 2, which are series-connected on the product side and which have different mean product temperatures, can be operated on a common alternating current source 7. This will reduce the amount of equipment required and facilitate the control of the treatment process.

The spacing 17 between the electrodes is preferably adapted to the electric conductance of the product 3; the specific conductance can range from 30 μS/cm to 10,000

μS/cm. It is thus possible to heat different products with a uniform alternating current generator.

An alternating voltage of at least 10 kHz is preferably applied to the electrodes 5, 6. In this frequency range, corrosion of the electrodes 5, 6 can be prevented in a particularly efficient manner.

A preferred embodiment is so conceived that, in the area of the first electrode 5, the product flows in tangentially on the wall of the treatment channel such that a turbulent flow is produced on the first electrode 5 so as to avoid product depositions on said first electrode 5. The quality of the product 3 can be guaranteed in this way.

While there have been shown and described fundamental novel features of the invention as applied to the preferred and exemplary embodiments thereof, it will be understood that omissions and substitutions and changes in the form and details of the disclosed invention may be made by those skilled in the art without departing from the spirit of the invention. Moreover, as is readily apparent, numerous modifications and changes may readily occur to those skilled in the art. Hence, it is not desired to limit the invention to the exact construction and operation shown and described and, accordingly, all suitable modification equivalents may be resorted to falling within the scope of the invention as claimed. It is the intention, therefore, to be limited only as indicated by the scope of the claims appended hereto.

What is claimed is:

1. An apparatus for heating a product, comprising:
   at least one heating module having a treatment channel through which the product may flow;
   a first inlet-side electrode provided proximate a first end of the treatment channel and a second outlet-side electrode provided proximate an opposite second end of the treatment channel, wherein the first inlet-side electrode and second outlet-side electrode are configured as lids, which are disposed in or on the ends of the treatment channel and which seal the opposite ends of the treatment channel;
   an alternating current source coupled to the first inlet-side electrode and the second outlet-side electrode for generating an electromagnetic alternating field in the treatment channel,
   wherein the treatment channel is designed and configured to facilitate the flow of product substantially in a main flow direction from the first inlet-side electrode to the second outlet-side electrode; and
   wherein the first inlet-side electrode and second outlet-side electrode are each capable of directly contacting the product.

2. The apparatus of claim 1, wherein the product is a beverage.

3. The apparatus of claim 1, wherein the product is a milk type beverage.

4. The apparatus of claim 1, wherein the first inlet-side electrode and second outlet-side electrode each have a planar inner surface.

5. The apparatus of claim 1, further comprising an inlet channel terminating laterally into the treatment channel, the inlet channel including a portion which adjoins a wall of the treatment channel to permit the product to flow though the inlet channel into the treatment channel substantially tangentially along the wall of the treatment channel.

6. The apparatus of claim 5, wherein a cross-section of the inlet channel is smaller than the cross-section of the treatment channel such that the product substantially enters the treatment channel on one side of a main axis of the treatment channel.

7. The apparatus of claim 5, wherein the cross-section of the inlet channel is at least five times smaller than the cross-section of the treatment channel to facilitate precision and speed in the flow of the product.

8. The apparatus of claim 5, wherein the cross-section of the inlet channel is at least ten times smaller than the cross-section of the treatment channel to facilitate precision and speed in the flow of the product.

9. The apparatus of claim 5, wherein a distance between the inlet channel and the first inlet-side electrode does not exceed 3 mm.

10. The apparatus of claim 5, wherein a distance between the inlet channel and the first inlet-side electrode does not exceed 1 mm.

11. The apparatus of claim 1, further comprising an outlet channel laterally connected to the treatment channel, the outlet channel comprising a portion which adjoins a wall of the treatment channel to permit the product to flow out of the treatment channel into the outlet channel substantially tangentially along the wall of the treatment channel.

12. The apparatus of claim 1, wherein the treatment channel includes a recess on an inner wall of the treatment channel for conducting the product along a helical line in the main flow direction.

13. The apparatus of claim 12, wherein the recess has a helical or an arcuate shape.

14. The apparatus of claim 1, wherein an inlet opening for introduction of the product is formed in a first lateral outer surface of the heating module and an outlet opening for the product is formed in a second lateral outer surface, the heating module designed and configured such that multiple heating modules can be placed side by side to connect the treatment channels of each heating module in series and the main flow directions of the each heating module are substantially opposed to a neighboring heating module.

15. The apparatus of claim 1, further comprising a space between the first inlet-side electrode and the second outlet-side electrode that is between 20 and 800 mm.

16. The apparatus of claim 1, further comprising a space between the first inlet-side electrode and the second outlet-side electrode that is between 20 and 500 mm.

17. The apparatus of claim 1, wherein the treatment channel includes a surface roughness that has a height that does not exceed 1 μm.

18. The apparatus of claim 1, wherein the first inlet-side electrode and the second outlet-side electrode are formed of a material that is substantially corrosion resistant at an alternating current frequency of at least 10 kHz and that is compatible with food.

19. The apparatus of claim 1, further comprising at least two heating stages connected in series with respect to the product flow, each heating stage having a predetermined temperature setting, wherein each heating stage includes one or more heating modules with a space between the first inlet-side electrode and the second outlet-side electrode of the heating module, wherein the space of each heating module of the same heating stage is substantially identical and the space has a size based on the predetermined temperature setting.

20. The apparatus of claim 19, wherein the first inlet-side electrode and the second outlet-side electrode of the heating modules of different heating stages are connected in parallel to the alternating current source.

21. A method for heating a product, comprising the steps of:
    providing a heating module having a treatment channel, a first electrode disposed proximate a first end of the treatment channel, and a second electrode proximate an opposite second end of the treatment channel, wherein the first electrode and second electrode are each configured as lids, which are disposed in or on the ends of the treatment channel and which seal the opposite ends of the treatment channel and are each capable of directly contacting the product;

conducting the product in a continuous flow through the treatment channel, wherein the treatment channel is designed and configured such that the product flows substantially in a main flow direction from the first electrode toward the second electrode; and generating an electromagnetic alternating field in the treatment channel between the first electrode and the second electrode to heat the product.

22. The method of claim 21, wherein the flow of the product is conducted at a flow velocity sufficient to facilitate heating of the product.

23. The method of claim 21, further comprising providing a space between the first electrode and second electrode, the space having a size sufficient to facilitate a mean product temperature in the treatment channel such that a plurality of series-connected heating modules having different mean product temperatures may be operated using a common alternating current source.

24. The method of claim 21, further comprising:
providing a space between the first electrode and second electrode based on an electric conductance of the product in the range of 30 µS/cm to 10,000 µS/cm.

25. The method of claim 21, further comprising:
applying an alternating voltage of at least 10 kHz to the first and second electrodes.

26. The method of claim 21, further comprising:
conducting the product flow tangentially along a wall of the treatment channel such that a turbulent flow is produced proximate the first electrode so as to avoid product deposits on the first electrode.

27. The method of claim 21, wherein the flow of the product is conducted at a flow velocity sufficient to prevent the product from leaving product deposits in the treatment channel.

28. The apparatus of claim 1, wherein the first inlet-side electrode and second outlet-side electrode each have a substantially curved inner surface.

29. The method of claim 21, wherein the first electrode and second electrode each have a planar inner surface.

30. The method of claim 21, wherein the first electrode and second electrode each have a substantially curved inner surface.

* * * * *